United States Patent
Kim et al.

(10) Patent No.: US 9,055,066 B2
(45) Date of Patent: Jun. 9, 2015

(54) APPARATUS AND METHOD FOR PROVIDING A GAME SERVICE IN CLOUD COMPUTING ENVIRONMENT

(75) Inventors: I-Gil Kim, Gyeonggi-do (KR); Sun-Jong Kwon, Seoul (KR); Gyu-Tae Baek, Seoul (KR); Ki-Hoon Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 107 days.

(21) Appl. No.: 13/332,612

(22) Filed: Dec. 21, 2011

(65) Prior Publication Data

US 2012/0184373 A1 Jul. 19, 2012

(30) Foreign Application Priority Data

Dec. 24, 2010 (KR) .................. 10-2010-0134837

(51) Int. Cl.
*A63F 9/24* (2006.01)
*H04L 29/08* (2006.01)
*H04L 29/06* (2006.01)

(52) U.S. Cl.
CPC ............ *H04L 67/10* (2013.01); *H04L 65/4084* (2013.01); *H04L 67/38* (2013.01)

(58) Field of Classification Search
CPC .................. G06F 17/30861; G06F 17/30194; G06F 2221/2149; A63F 2300/538; A63F 13/335; A63F 2300/209; A63F 2300/534; G07F 17/3225
USPC ............ 709/203, 205, 207, 225, 227; 710/18, 710/20
See application file for complete search history.

(56) References Cited

U.S. PATENT DOCUMENTS

| 6,624,761 B2 * | 9/2003 | Fallon .............................. 341/51 |
| 7,426,304 B2 | 9/2008 | Cheung et al. |
| 7,849,491 B2 | 12/2010 | Perlman |
| 2008/0207322 A1 * | 8/2008 | Mizrahi .......................... 463/32 |
| 2009/0118017 A1 | 5/2009 | Perlman et al. |
| 2009/0118018 A1 | 5/2009 | Perlman et al. |
| 2009/0118019 A1 | 5/2009 | Perlman et al. |
| 2009/0119729 A1 | 5/2009 | Perlman et al. |
| 2009/0119730 A1 | 5/2009 | Perlman et al. |
| 2009/0119731 A1 | 5/2009 | Perlman et al. |
| 2009/0119736 A1 | 5/2009 | Perlman et al. |
| 2009/0119737 A1 | 5/2009 | Perlman et al. |
| 2009/0119738 A1 | 5/2009 | Perlman et al. |
| 2009/0124387 A1 | 5/2009 | Perlman et al. |
| 2009/0125961 A1 | 5/2009 | Perlman et al. |
| 2009/0125967 A1 | 5/2009 | Perlman et al. |
| 2009/0125968 A1 | 5/2009 | Perlman et al. |

(Continued)

FOREIGN PATENT DOCUMENTS

| KR | 10-2006-0025099 A | 3/2006 |
| KR | 10-2006-0110267 A | 10/2006 |

(Continued)

*Primary Examiner* — Steve Rowland
(74) *Attorney, Agent, or Firm* — IP Legal Services, LLC

(57) ABSTRACT

An apparatus and method for providing a game service in cloud computing environment. A method may be provided for providing a streaming game service using a plurality of cloud computing servers. The method may include receiving user inputs from at least one user equipments, executing and progressing at least one game program in response to the user inputs, capturing audio and video data as progress results of the executed at least one game program, and streaming the captured audio and video data to a respective user equipment.

20 Claims, 6 Drawing Sheets

(56) References Cited

U.S. PATENT DOCUMENTS

| | | |
|---|---|---|
| 2009/0196516 A1 | 8/2009 | Perlman et al. |
| 2009/0213927 A1 | 8/2009 | Perlman et al. |
| 2009/0213935 A1 | 8/2009 | Perlman et al. |
| 2009/0215531 A1 | 8/2009 | Perlman et al. |
| 2009/0215540 A1 | 8/2009 | Perlman et al. |
| 2009/0220001 A1 | 9/2009 | Perlman et al. |
| 2009/0220002 A1 | 9/2009 | Perlman et al. |
| 2009/0225220 A1 | 9/2009 | Perlman et al. |
| 2009/0225828 A1 | 9/2009 | Perlman et al. |
| 2009/0225863 A1 | 9/2009 | Perlman et al. |
| 2009/0228946 A1 | 9/2009 | Perlman et al. |
| 2010/0111489 A1* | 5/2010 | Presler ............................ 386/52 |
| 2010/0124992 A1 | 5/2010 | Park et al. |
| 2010/0166056 A1 | 7/2010 | Perlman et al. |
| 2010/0166058 A1 | 7/2010 | Perlman et al. |
| 2010/0166062 A1 | 7/2010 | Perlman et al. |
| 2010/0166063 A1 | 7/2010 | Perlman et al. |
| 2010/0166064 A1 | 7/2010 | Perlman et al. |
| 2010/0166065 A1 | 7/2010 | Perlman et al. |
| 2010/0166066 A1 | 7/2010 | Perlman et al. |
| 2010/0166068 A1 | 7/2010 | Perlman et al. |
| 2010/0167809 A1 | 7/2010 | Perlman et al. |
| 2010/0167816 A1 | 7/2010 | Perlman et al. |
| 2010/0304860 A1* | 12/2010 | Gault et al. .................... 463/31 |
| 2011/0042726 A1 | 2/2011 | Banerjee et al. |
| 2011/0092291 A1 | 4/2011 | Perlman et al. |
| 2011/0105226 A1 | 5/2011 | Perlman et al. |
| 2011/0107220 A1 | 5/2011 | Perlman et al. |
| 2011/0122063 A1 | 5/2011 | Perlman et al. |
| 2011/0126255 A1 | 5/2011 | Perlman et al. |
| 2012/0088584 A1 | 4/2012 | Mamtani et al. |
| 2012/0108330 A1 | 5/2012 | Dietrich, Jr. et al. |
| 2012/0108331 A1 | 5/2012 | Dietrich, Jr. et al. |
| 2012/0115600 A1 | 5/2012 | Dietrich, Jr. et al. |
| 2012/0115601 A1 | 5/2012 | Dietrich, Jr. et al. |
| 2012/0124573 A1 | 5/2012 | Mamtani et al. |
| 2012/0142433 A1 | 6/2012 | Perlman et al. |
| 2012/0146105 A1 | 6/2012 | Banerjee et al. |
| 2012/0149476 A1 | 6/2012 | Perlman et al. |

FOREIGN PATENT DOCUMENTS

| | | |
|---|---|---|
| KR | 10-2009-0112433 A | 10/2009 |
| KR | 10-2010-0056873 A | 5/2010 |
| KR | 10-2010-0098668 A | 9/2010 |
| KR | 10-2010-0102625 A | 9/2010 |
| KR | 10-2010-0107113 A | 10/2010 |

* cited by examiner

APPARATUS AND METHOD FOR PROVIDING A GAME SERVICE IN CLOUD COMPUTING ENVIRONMENT

CROSS REFERENCE TO PRIOR APPLICATIONS

The present application claims priority under 35 U.S.C. §119 to Korean Patent Application No. 10-2010-0134837 (filed on Dec. 24, 2010), which is hereby incorporated by reference in its entirety.

FIELD OF THE INVENTION

Apparatuses and methods consistent with embodiments relate to providing a game service in a cloud computing environment. More particularly, the apparatuses and methods relate to executing at least one game program in a cloud computing server in response to user inputs, encoding and streaming progress results of the executed game program to at least one user equipment in parallel, and decoding and outputting the streamed execution results in respective user equipment.

BACKGROUND OF THE INVENTION

In order to play typical video games, users install respective game programs in their user equipment such as a personal computer (PC) or a game console and run the respective game program using resources of the user equipment. Since the entire game program is executed in the user equipment, the typical video game is dependent to the processing power of the user equipment.

As the Internet has advanced, a streaming game service has been introduced as a Software as a Service (SaaS). The streaming game service may be one of Game-On-Demand (GOD) services. The streaming game service does not require executing the entire respective game program in a user equipment. Accordingly, the streaming game service is less dependent on the processing power of the user equipment.

The streaming game service, however, is not significantly different from the typical video game because it also requires resources of the user equipment. For example, in order to play a video game through such a streaming game service, a game server processes a portion of respective game program and a user equipment processes the remaining portion of the respective game program.

Lately, various types of video games have been released on the markets. Many of the video games are three-dimensional (3D) video games that provide high resolution images and rich sound effects in order to satisfy demands of users. The 3D video game generally requires high-end user equipment in order to process high resolution images and rich sound effects. In order to play such a 3D video game, a user must have high-end user equipment with expensive graphics cards, fast CPUs and large capacity memories. Therefore, there is a need to provide streaming game services without requiring a high-end user equipment.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In embodiments, a plurality of game services may be provided without requiring high-end user equipment. In embodiments, a cloud computing server may execute and progress a respective game program in response to user inputs, capture audio and video data as the progress result of the executed respective game program, and transmit the captured audio and video data to respective user equipments. In embodiments, a cloud computing system may provide a streaming game service including a plurality of cloud computing servers and a plurality of user equipments.

The game server may include a plurality of processing units for simultaneously capturing, encoding, and streaming audio and video data generated from the at least one virtual machines in parallel. The cloud computing server may perform one of a software-based audio and video data capturing scheme and a hardware-based audio and video data capturing scheme according to a resolution of the audio and video data generated from the game server. The hardware-based audio and video data capturing device may be an independent device for capturing video data generated from the game server.

In accordance with embodiments, a method may be provided for providing a streaming game service using a plurality of cloud computing servers. The method may include receiving user inputs from at least one user equipments, executing and progressing at least one game program in response to the user inputs, capturing audio and video data as progress results of the executed at least one game program, and streaming the captured audio and video data to a respective user equipment.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
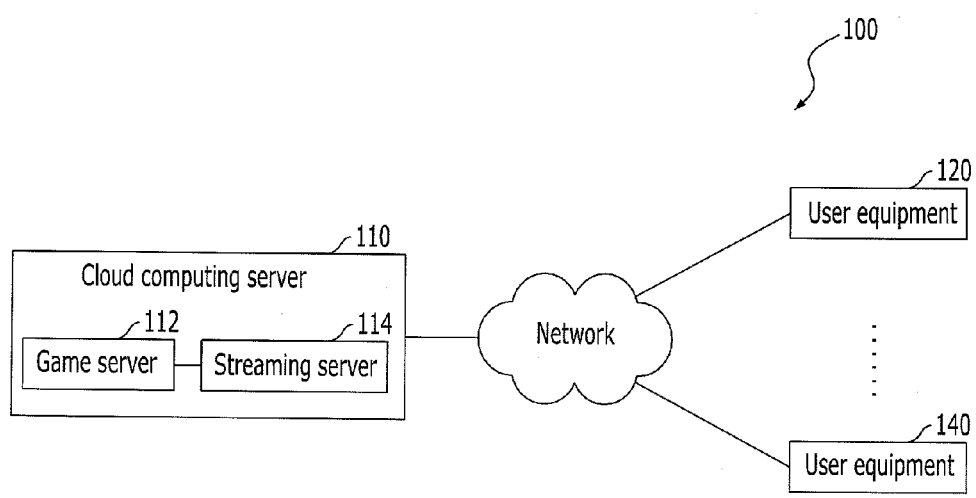
FIG. 1 illustrates a cloud computing system for providing a streaming game service, in accordance with embodiments.

Reference will now be made in detail to embodiments of the present invention, examples of which are illustrated in the accompanying drawings, wherein like reference numerals refer to like elements throughout. The embodiments are described below, in order to explain the present invention by referring to the figures.

Embodiments relate to an apparatus and method for providing a streaming game service of a desired video game without requiring high-end user equipment in accordance with embodiments. FIG. 1 illustrates a cloud computing system for providing a streaming game service, in accordance with embodiments.

Cloud computing system 100 in accordance with embodiments may provide a streaming game service for a desired video game without requiring high-end user equipment. In response to a user request, cloud computing system 100 may execute a game program of a desired video game through cloud computing server 110 having relatively high processing power, capture game screens and sounds as progress results of the game program, provide substantially only the captured game screens and sounds to a respective user, and progress the video game in response to user inputs entered based on the captured game screens and sounds from the respective user. Accordingly, cloud computing system 100 may not require high-end user equipment, in accordance with embodiments.

In order to provide a streaming game service in accordance with embodiments, cloud computing system 100 may include cloud computing server 110 and plurality of user equipments 120 to 140. Cloud computing server 110 and plurality of user equipments 120 to 140 may be coupled through a network. Cloud computing server 110 may create a plurality of virtual machines, install respective game programs of a desired video game in the plurality of virtual machines, execute the respective game program through the virtual machines, and control progress of the desired video game in response to user inputs entered into corresponding user equipment. As the desired video game is progressing, cloud computing server 110 may capture game screens and sounds of progressing video game and transmit the captured game screens and sounds to the user equipment in real time. The user equipment may output the captured game screens and sounds on a respective display module and a respective speaker. A respective user may play the desired video game while watching the output game screens and sounds and enter user inputs through input devices of the user equipment in order to progress the desired video game. Such user inputs may be transmitted to cloud computing server 110 through the respective user equipment in real time and cloud computing server 110 may progress the video game based on the user inputs. In this manner, cloud computing system 100 may not require high processing power of the user equipment except outputting the captured game screens and sounds through respective output devices. A user may not notice that the actual video game is executed in the cloud computing server 110, in accordance with embodiments.

Cloud computing server 110, in accordance with embodiments, will be described in detail with reference to FIG. 1. Cloud computing server 110 may be a distributed computing system having a high processing power. Cloud computing server 110 may create a plurality of virtual machines for simultaneously executing multiple video games. Cloud computing server 110 may be configured as one super computer. Alternatively, cloud computing server 110 may be configured of a plurality of computers coupled through a respective network. In embodiments, a plurality of computers may be controlled under a managing server and operate as one virtual computer.

Cloud computing server 110 may be coupled through a network with a plurality of user equipments 120 to 140 located at remote locations. Respective users may access cloud computing server 110 using corresponding user equipments 120 to 140. Cloud computing server 110 may receive user inputs from multiple users through the corresponding user equipments 120 to 140. Cloud computing server 110 may simultaneously execute multiple game programs of video games in parallel. For convenience and ease of understanding, cloud computing server 110 will be described as executing a game program for a user accessing cloud computing server 110 through user equipment 120, although embodiments appreciate other similar and functionally equivalent variations. Cloud computing server 10 may simultaneously execute multiple game programs in parallel for multiple users accessing through a plurality of user equipments 120 to 140.

Cloud computing server 110 may include a game server 112 and a streaming server 114, in accordance with embodiments. Game server 112 may simultaneously execute at least one game program of video games that a plurality of users want to play. Game server 112 may create a plurality of virtual machines for executing multiple game programs in parallel. For convenience and ease of understanding, game server 112 will be described as executing one game program that one user wants to play, but embodiments are clearly not limited to one game program and one user.

As a desired video game is progressing, game server 112 may generate progress results of the desired video game. For example, the progress results may be game screens and sounds. Streaming server 114 may capture the progress results of the desired video game. For example, streaming server 114 may capture game screens and sounds as the progress results. Such captured progress results may be audio and video data. Streaming server 114 may encode the captured progress result as audio and video data and stream the encoded audio and video data to user equipment 120 in real time.

User equipment 120 may receive the encoded audio and video data stream from streaming server 114 of cloud computing server 110 without noticeable delay. User equipment 120 may decode the received audio and video data stream and output the decoded audio and video through respective output devices such as a display module and a speaker. User equipment 120 may display game screens and sounds by decoding the received audio and video stream. A respective user may play a desired video game while watching game screens and sounds output through user equipment 120. Although an entire game program may be executed in cloud computing server 110, the respective users may feel that the game program is being executed in user equipment 120.

The respective user may enter user inputs to user equipment 120 based on the game screens and sounds output through user equipment 120. The entered user inputs may be transmitted to cloud computing server 110 in real time. Cloud computing server 110 may receive the user inputs and progress the game program based on the received user inputs.

Although cloud computing server 110 was described as executing one game program of the user of user equipment 120, cloud computing server 110 may simultaneously execute a plurality of game programs and transmit the respective progress results of the executed game programs to plurality of user equipments 120 to 140 in real time. In order to process such operations without delay and in real time, cloud computing server 110 may include multiple processors and use a parallel compression scheme for compressing audio and video data of the game programs and for transmitting the compressed audio and video data to plurality of user equipments 120 to 140 in real time without delay.

Cloud computing server 110 may include a graphics card having a high-performance graphics processing unit (GPU) for processing video data of a respective game program that requires a high power computing device. For example, in accordance with embodiments, cloud computing server 110 may include a General-Purpose computing on Graphics Processing Unit (GPGPU) in order to process burdensome graphic operation on behalf of a central processor unit, but other variations are appreciated in accordance with embodiments. Accordingly, cloud computing server 110 may have a relatively high system efficiency.

Although a video game may require a relatively high processing power computing device, cloud computing system 100 may not require high-end user equipment. This may be possible because cloud computing server 110 may execute an entire game program and transmit only progress results of the executed game program (e.g. game screens and sounds) to user equipment in real-time. Cloud computing server 110 may receive user inputs entered based on the game screens and sounds output through the respective user equipment and continuously progress the respective game program based on the received user inputs. That is, cloud computing server 110 may not require the processing power of the user equipment for executing the respective game program. Plurality of user equipments 120 to 140 may use minimum hardware resources for decoding audio and video data streaming and outputting the decoded audio and video data through respective output devices such as a display module and a speaker. Thus, in accordance with embodiments, the respective user can play video games without having high-end user equipment.

Plurality of user equipments 120 to 140 may receive user inputs entered from respective users based on the game screens and sounds output through respective user equipments 120 to 140. Plurality of user equipments 120 to 140 may transmit the received user inputs to cloud computing server 110 located at a remote location in real time without delay. Plurality of user equipments 120 to 140 may interact with cloud computing server 110 through transmitting user inputs and receiving audio and video data streaming as progress results of the executed game programs.

Since cloud computing server 110 executes and progresses a respective game program in response to user inputs with high processing power and parallel compression scheme, cloud computing server 110 may provide a streaming game service in real time without delay. Accordingly, the respective users may not notice that the video game program is executed in cloud computing server 110 which may be located at a remote location separated from the respective user equipment.

Plurality of user equipments 120 to 140 may include at least one of multimedia players in order to output audio and video data streaming received from cloud computing server 110 through a network. For example, plurality of user equipments 120 to 140 may include PCs, mobile phones, smart phones, Portable Multimedia Players (PMPs), Internet protocol television (IPTV) settop boxes, notebook computers, Personal Digital Assistants (PDAs), Mobile Broadcast System (MBS) phones, and other functionally similar devices in accordance with embodiments.

Plurality of user equipments 120 to 140 may include a module for transmitting the user inputs to cloud computing server 110 because cloud computing server 110 progresses a respective video game in response to the user inputs transmitted from plurality of user equipments 120 to 140 in real time. Cloud computing server 110 may further include a module (not illustrated) for progressing a game program based on commands such as the user inputs received from plurality of user equipments 120 to 140. For example, such a module may be a server agent, in according with embodiments.

Figure 2:
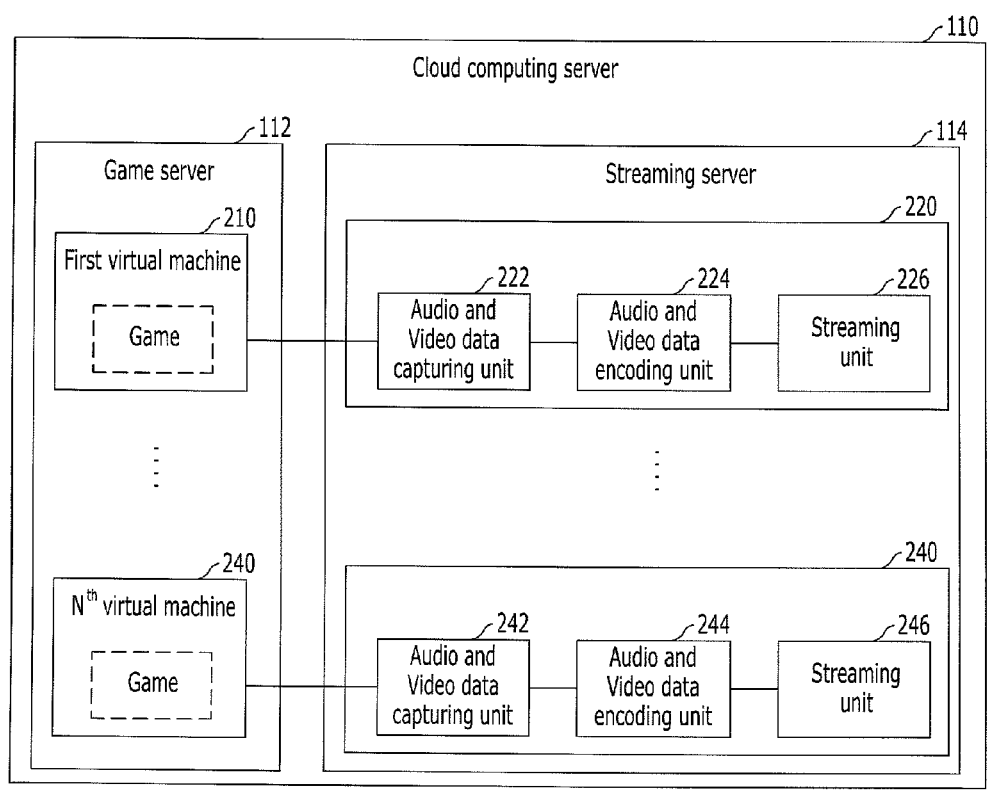
FIG. 2 illustrates a cloud computing server in accordance with embodiments.

FIG. 2 illustrates a cloud computing server, in accordance with embodiments. In accordance with embodiments, cloud computing server 110 may perform game virtualization and parallel audio and video encoding. Cloud computing server 110 may include game server 112 and streaming server 114, in accordance with embodiments. Game server 112 may create a plurality of independent virtual machines 210 to 240 corresponding to plurality of user equipments 120 to 140 and simultaneously execute a plurality of game programs through corresponding virtual machines 210 to 240. Game server 112 may execute game programs of desired video games through plurality of created virtual machines 210 to 240 in response to user inputs received from the corresponding user equipments 120 to 140.

Streaming server 114 may capture audio and video data of the progressing game programs in parallel. In embodiments, audio and video data may be game screens and sounds. Streaming server 114 may encode the captured audio and video data in parallel, and stream the encoded audio and video data to plurality of user equipments 120 to 140 in real time. In order to process such operations in parallel, streaming server 114 may include a plurality of processing units 220 to 240. Such processing units 220 to 240 may be central CPUs or GPGPUs. In accordance with embodiments, cloud computing server 110 may perform creating virtual machines, executing at least one respective game program through the created virtual machines, capturing audio and video data, encoding the captured audio and video data, and streaming the encoded audio and video data based on a parallel processing scheme using plurality of processing units 220 and 240 that simultaneously process user inputs (e.g. commands for respective video games) from multiple users. Accordingly, cloud computing server 110 may provide streaming game services to a plurality of user equipment using one game server 112 and one streaming server 114.

As described above, streaming server 114 may include a plurality of processing units 220 to 240. Each one of plurality of processing units 220 to 240 may include audio and video capturing unit 222 to 242, a video encoding unit 224 to 244, and a streaming unit 226 to 246. The audio and video capturing unit 222 may capture audio and video data of a respective video game progressing through one of virtual machines created by the game server 112. The audio and video encoding unit 224 may encode the captured audio and video data. The streaming unit 226 may stream the encoded audio and video data to a respective user equipment. The present invention is, however, not limited to the configuration of the streaming server 114 of FIG. 2. For example, the audio and video capturing unit 222 may be included in the game server 112, or the audio and video encoding unit 224 and the streaming unit 226 may be implemented as one module.

As described above, game server 112 of the cloud computing server 110 may simultaneously execute and progress respective video games in response to user inputs through the plurality of virtual machines 210 to 240. Streaming server 114 may capture the images and sounds of games, which may be progress results of the video games, through audio and video capturing units 222 to 242. Furthermore, streaming server 114 may encode the captured images and sounds through audio and video encoding units 224 to 244 and stream the encoded images and sounds to the plurality of user equipments through the streaming unit 226. Such processes may be performed in parallel through plurality of virtual machines 210 to 240 of the game server 112 and plurality of processing units 220 to 240 of streaming server 114. Therefore, respective users may receive corresponding game service streaming in real time without noticeable delay, in accordance with embodiments.

Figure 3:
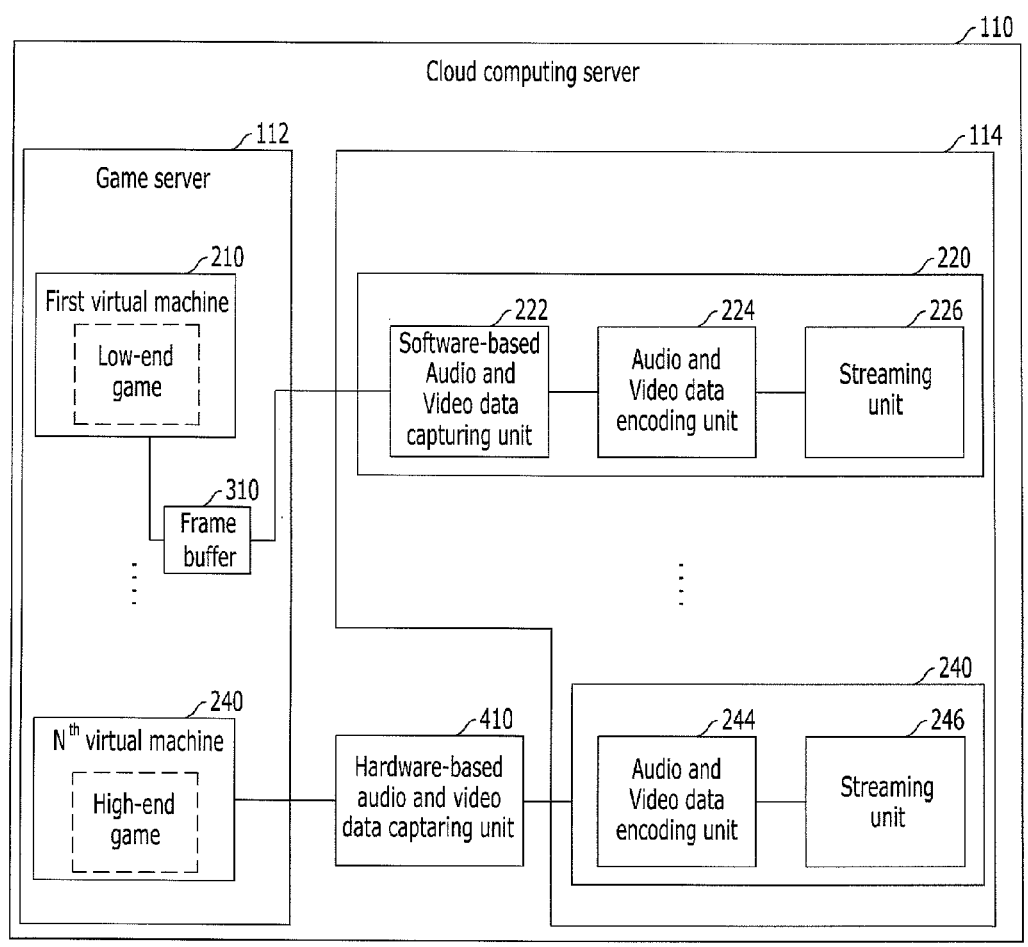
FIG. 3 illustrates a cloud computing server for describing an operation for capturing progress results of a desired video game, in accordance with embodiments.

An operation for capturing audio and video data will be described in detail with reference to FIG. 3, in accordance with embodiments. FIG. 3 illustrates a cloud computing server for describing an operation for capturing progress results of a desired video game, in accordance with embodiments. Cloud computing server 110 may perform a hybrid audio and video capturing scheme in accordance with embodiments.

As described above with reference to FIG. 2, game server 112 may create plurality of virtual machines 210 and 240 and simultaneously execute game programs and progress corresponding video games through plurality of virtual machines 210 and 240. Streaming server 114 may perform capturing audio and video data, encoding the captured audio and video data, and streaming the encoded audio video data using plurality of processing units in parallel.

Referring to FIG. 3, cloud computing server 110 may use a hybrid audio and video capturing scheme to capture the audio and video data of games, which are progress results of respective video games executed and progressing in plurality of virtual machines 210 and 240. Such a hybrid audio and video capturing scheme may improve the audio and video capturing efficiency, in accordance with embodiments. A hybrid audio and video capturing scheme may enable cloud computing server 110 to dynamically perform a software-based audio and video capturing scheme or a hardware-based audio and video capturing scheme according to resolutions of game screens generated as results of progressing a respective video game, in accordance with embodiments.

As shown in FIG. 3, first virtual machine 210 may be allocated to execute a game program of a video game requiring at relatively low processing power, which may generate game screens in low resolution, in accordance with embodiments. Such a game may be referred to as a low-end video game. $N^{th}$ virtual machine 220 may be allocated to execute a game program of a video game requiring relatively high processing power, which may generate game screens in high resolution. Such a game program may be referred to as a high-end video game. Embodiments, however, are non-limiting and include other variations in accordance with embodiments. For example, a low-end video game or a high-end video game may be executed and progressing in any one of first to $N^{th}$ virtual machines 210 and 240.

As shown in FIG. 3, streaming server 114 may perform one of a software-based audio and video capturing scheme and a hardware-based audio and video capturing scheme according to the type of video game. Embodiments, however, are non-limiting and include other variations in accordance with embodiments. For example, game server 112 may perform one of the software-based audio and video capturing scheme and a hardware-based audio and video capturing scheme instead of streaming server 114.

Streaming server 114 may perform a software-based audio and video capturing scheme when a resolution of a game screen is lower than a reference resolution. For example, as the software-based audio and video capturing scheme, streaming server 114 may read audio and video data from frame buffer 310 in game server 112 when the resolution of the audio and video data is lower than a reference resolution. The reference resolution may be a high definition (HD) resolution, in accordance with embodiments. The HD resolution may be a resolution of 1280×720, but embodiments are not limited to this resolution value. A low-end video game may generate game screens in low resolution such as a standard definition (SD) resolution. The SD resolution may be a resolution of 640×480, but embodiments are not limited to this resolution value.

In low-end video game producing SD resolution game screens, a software-based audio and video capturing scheme may be performed. In a software-based audio and video capturing scheme, streaming server 114 may read the audio and video data stored in frame buffer 310 of game server 112 using one of the processing units of streaming server 114. Cloud computing server 110 may allocate software-based audio and video capturing unit 222 for reading the audio and video data from frame buffer 310 of game server 112. For example, game server 112 may transmit data for a plurality of game screens to streaming server 114 through a network. Since game server 112 may generate the game screens in a relatively low resolution, transmission delay and data capturing delay may be relatively low. Accordingly, a software-based audio and video data capturing scheme may be proper for a relatively low resolution game screen, in accordance with embodiments.

In embodiments, streaming server 114 may allocate first processing unit 220 for a low-end video game. First processing unit 220 may include software-base audio and video capturing unit 222. Software-based audio and video capturing unit 222 may perform a software-based audio and video capturing scheme. For example, software-based audio and video capturing unit 222 may receive audio and video data from game server 112 through a network and capture audio and video data. Particularly, software-based audio and video capturing unit 222 may use a capturing software program running using processing power of first processing unit 220 of streaming server 114.

For high-end video game producing HD resolution game screens, the software-based audio and video capturing scheme may cause a relatively large delay. Accordingly, streaming server 114 may perform a hardware-based audio and video capturing scheme when a resolution of a game screen is equal to and/or greater than a reference resolution, in accordance with embodiments.

When the resolution of a game screen is equal to and/or greater than a reference resolution, streaming server 114 may allocate hardware-based audio and video capturing unit 410 for capturing audio and video data. Hardware-based audio and video data capturing unit 410 may perform the hardware-based audio and video capturing scheme. Hardware-based audio and video capturing unit 410 may be a dedicated hardware device for capturing audio and video data generated from corresponding virtual machine 240. Hardware-based audio and video capturing unit 410 may be coupled to game sever 112 through a physical cable such as a High Definition Multimedia Interface (HDMI) cable, in accordance with embodiments. Particularly, hardware-based audio and video capturing unit 410 may be a frame grabber. Hardware-based audio and video capturing unit 410 may be an independent capturing device. For example, a frame grabber may be used to capture audio and video data of a high-end video game as hardware-based audio and video capturing unit 410. Particularly, game server 112 may generate audio and video data as progress results of a respective video game and output the audio and video game to the frame grabber through an HDMI cable. The frame grabber may receive analog image signals generated by a television and a charge-coupled device (CCD) camera and digitalizes the analog image signals based on defined bits per sample. A frame grabber may convert the analog image signal to a digital image signal that can be processed through a computing device. In embodiments, a frame grabber may also be referred to as an image board.

Streaming server 114 may allocate the $N^{th}$ processing unit 240 for encoding and streaming the captured audio and video data of hardware-based audio and video data capturing unit 410. In order to encode and stream, Nth processing unit 240 may include an audio and video data encoding unit 244 and streaming unit 246. Hardware-based audio and video data capturing unit 410 may be coupled to streaming server 114 through one of a physical cable and a network. However, other variations are appreciated in accordance with embodiments. For example, audio and video data encoding unit 244 and streaming unit 246 may be implemented as one independent device with hardware-based audio and video data capturing unit 410, in accordance with embodiments.

Hardware-based audio and video data capturing unit 410 may operate independently from cloud computing server 110. Hardware-based audio and video data capturing unit 410 may minimize delay in capturing audio and video data and delay in transmitting data through the internal bus of cloud computing server 110. Accordingly, cloud computing server 110 may capture high resolution audio and video data, such as HD game screens, in real time without delay using hardware-based audio and video data capturing unit 410.

Figure 4:
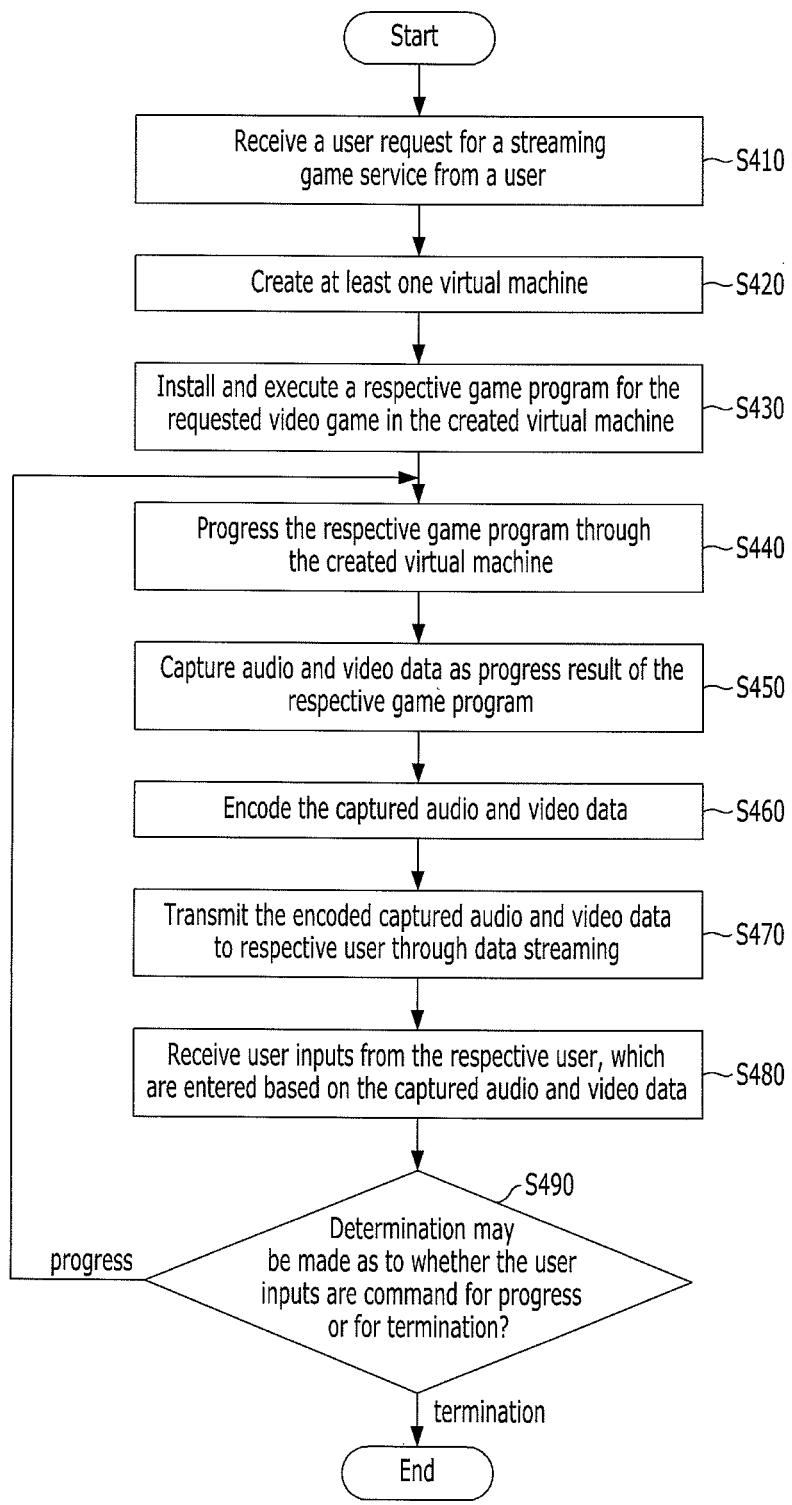
FIG. 4 illustrates a method for providing a streaming game service in a cloud computing environment, in accordance with embodiments.

FIG. 4 illustrates a method for providing a streaming game service in a cloud computing environment, in accordance with embodiments. Referring to FIG. 4, a user request for a streaming game service may be received S410. For example, a user may access cloud computing server 110 located at a remote location using a corresponding user equipment and transmit a user request for receiving a desired streaming game service through the corresponding user equipment. Accordingly, cloud computing server 110 may receive the user request.

In response to the user request, at least one virtual machine may be created S420. For example, cloud computing server 110 may create at least one virtual machine 210 to in response to the user request. Furthermore, game server 112 of cloud computing server 110 may create plurality of virtual machines 210 to 240 in response to user requests from multiple users. For convenience and ease of understanding, a method for providing a streaming game service in accordance with embodiments will be described as creating virtual machine 210 and providing a streaming game service to a user of user equipment 120 hereinafter. However, variations are appreciated in embodiments.

A respective game program may be installed and executed through virtual machine S430. For example, game server 112 may install a respective game program in response to a user request and execute the installed game program through created virtual machine 210. The user request may include information on a game that the user wants to play and commands for initially progressing the game. Based on the information included in the user request, game server 112 may install and execute the respective game program through created virtual machine 210. The respective game program may progress through created virtual machine S440. For example, game server 112 may progress the respective game program based on information initially included in the user request. Furthermore, game server 112 may receive additional user inputs from the user through user equipment 120.

Audio and video data, which is generated from game server 112 as progress results of the respective game program, may be captured S450. For example, game server 112 may generate audio and video data as the progress result of the respective game program. As described above, the audio and video data may be game screens and sounds, but other content types may be appreciated in accordance with embodiments. Streaming server 114 may capture such audio and video data generated from game server 112. Particularly, audio and video capturing unit 222 of the streaming server 114 may capture the audio and video data from game server 112.

The captured audio and video data may be encoded S460. For example, audio and video encoding unit 224 of streaming server 114 may encode the captured audio and video data. The encoded audio and video data may be transmitted through streaming S470. For example, streaming unit 226 of streaming server 114 may transmit encoded audio and video data to user equipment 120 in real time.

User equipment 120 may receive the encoded audio and video data in real time and decode the received audio and video data. User equipment 120 may output the decoded audio and video data through respective output devices such as a display module and/or speakers. Particularly, user equipment 120 may display the game screens through a respective display module and play back the sounds through speakers. The user may play the respective game while watching the game screens and listening to the sounds. Furthermore, the user may enter user inputs based on the game screens and sounds output through the respective output devices. The user inputs may be commands for controlling progress of the respective game or commands for terminating the respective game. The user inputs may be transmitted to cloud computing server 110 in real time.

The user inputs may be received S480. For example, cloud computing server 110 may receive the user inputs from user equipment 120. A determination may be made as to whether the user inputs are commands for termination of the respective game program or commands for continuously progressing the respective game program S490. When the received user inputs are the commands for continuously progressing the respective game program (Commands for progress-S490), the respective game program may continuously progress based on the received user inputs S440. When the received user inputs are commands for termination of the respective game program (Commands for termination-S490), cloud computing server 110 may terminate the corresponding streaming game service.

Although a method for providing a streaming game service was described as creating a single virtual machine for one respective game program and using one processing unit for capturing, encoding, and streaming audio and video data of the one respective game program, embodiments are not limited to this simplified description and embodiments may include multiple virtual machines and/or multiple processing units in accordance with embodiments. For example, a plurality of virtual machines may be created for simultaneously installing and executing multiple game programs, in accordance with embodiments. Furthermore, a plurality of processing units of streaming server 114 may simultaneously capture, encode, and stream audio and video data of multiple progressing game programs in parallel. For example, cloud computing server 110 may use a parallel processing scheme that simultaneously executes a plurality of commands through a plurality of processing units. Accordingly, cloud computing server 110 may provide different streaming game services to multiple users at the same time with one game server and one streaming server.

Figure 5:
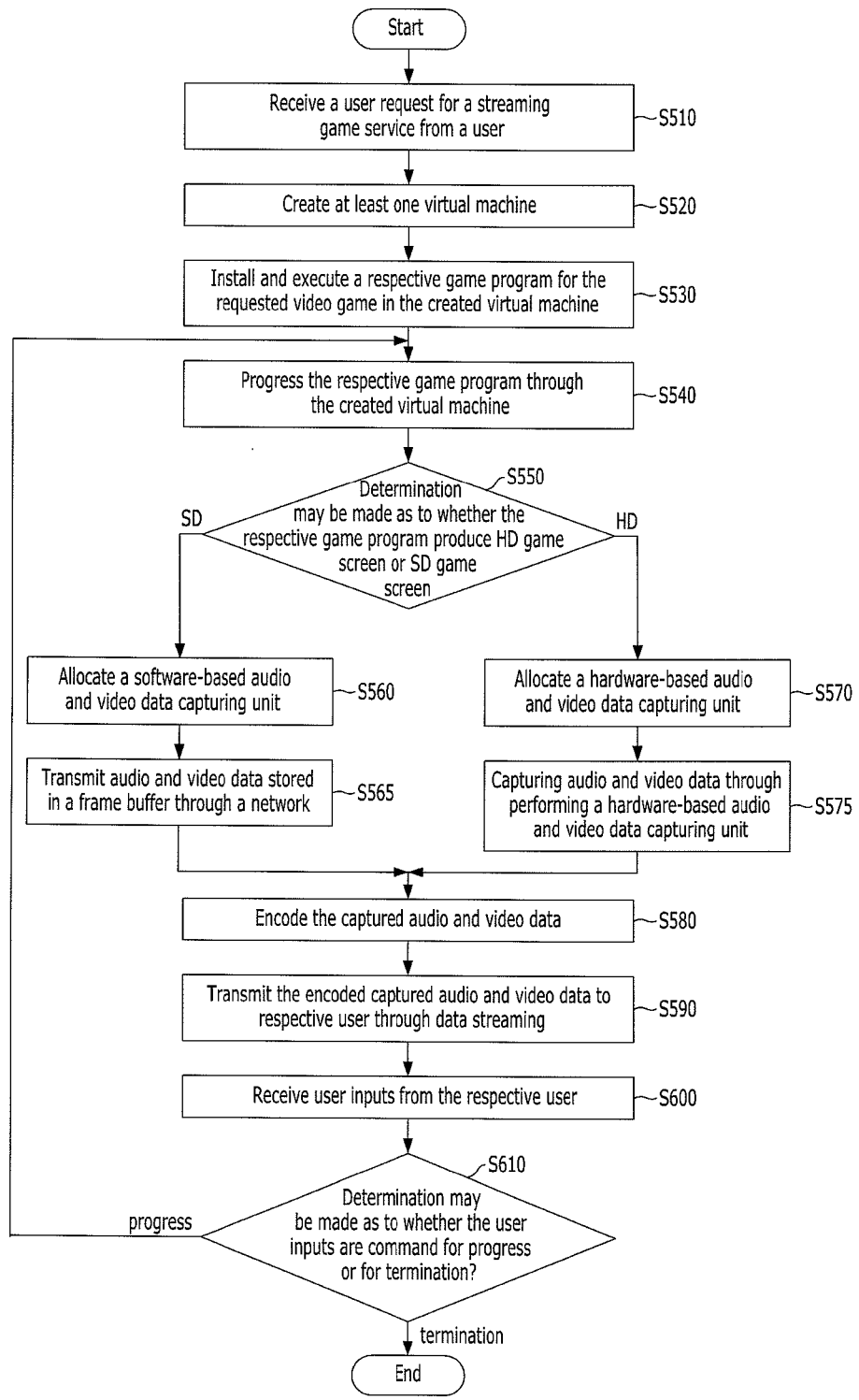
FIG. 5 illustrates a method for providing a streaming game service using a hybrid capturing scheme, in accordance with embodiments.

In order to efficiently perform capturing audio and video data of multiple game programs executed and processing through virtual machines, cloud computing server 110 may perform a hybrid capturing scheme, in accordance with embodiments. An example hybrid capturing scheme is described in detail with reference to FIG. 5, in accordance with embodiments. FIG. 5 illustrates a method for providing a streaming game service using a hybrid capturing scheme, in accordance with embodiments.

Referring to FIG. 5, a user request for a streaming game service may be received S510. For example, a user may access cloud computing server 110 located at a remote location and transmit a user request for receiving a desired streaming game service through a corresponding user equipment. Accordingly, cloud computing server 110 may receive the user request. In response to the user request, at least one virtual machine may be created S520. For example, cloud computing server 110 may create at least one virtual machine 210 to in response to the user request. Furthermore, game server 112 of cloud computing server 110 may create plurality of virtual machines 210 to 240 in response to user request from multiple users. For convenience and ease of understanding, a method for providing streaming game service in accordance with embodiments will be described as creating virtual machine 210 and providing a streaming game service to a user of the user equipment 120 hereinafter, but embodiments are not limited to this simplified description.

A respective game program may be installed and executed through virtual machine S530. For example, game server 112 may install the respective game program in response to the user request and execute the installed game program through created virtual machine 210. The user request may include information on a game that the user wants to play and commands for initially progressing the game. Based on the information included in the user request, game server 112 may install and execute the respective game program through created virtual machine 210.

A respective game program may progress through the created virtual machine S540. For example, game server 112 may progress the respective game program based on information initially included the user request. Game server 112 may receive additional user inputs from the user through user equipment 120.

Determination may be made as to whether the respective game program generates audio and video data in high resolution or in standard resolution S550. For example, in order to make such a determination, cloud computing server 110 may compare a resolution of the audio and video data from game server 112 with a reference resolution. Cloud computing server 110 may perform different capturing schemes according to the determined result. A reference resolution may be a high definition (HD) resolution, in accordance with embodiments. The HD resolution may be a resolution of 1280×720, but embodiments are not limited to this resolution value.

When the resolution of the read video data is lower than the reference resolution, a software-based audio and video data capturing scheme may be performed S560 and S565. Particularly, software-based audio and video data capturing unit 222 may be allocated S560, and the respective audio and video data may be read from frame buffer 310 of game server 112 through a respective network S565. For example, game server 112 may transmit the audio and video data stored in frame buffer 310 to streaming server 114 through a respective network.

When the resolution of the read video data is equal to and/or higher than the reference, a hardware-based audio and video data capturing scheme may be performed S570 and S575. Particularly, hardware-based audio and video data capturing unit 410 may be allocated S570, and the respective audio and video data may be captured through performing a hardware-based audio and video data capturing scheme S575. For example, hardware-based audio and video capturing unit 410 may receive audio and video data through a physical cable coupled to game server 112 and capture the audio and video data. Hardware-based audio and video capturing unit 410 may be a dedicated capturing device such as a frame grabber. Since cloud computing server 110 may perform a hybrid audio and video data capturing scheme, cloud computing server 110 may capture high quality audio and video data more efficiently at high speed.

The captured audio and video data may be encoded S580, and the encoded audio and video data may be transmitted to the respective user equipment through data streaming S590. Such encoding and streaming operation may be performed by a certain processing unit of streaming server 114. However, embodiments are clearly not limited to this configuration. A encoding and streaming operation may be performed in hardware-based audio and video capturing unit 410 that may be an independent device from streaming server 114. User equipment 120 may receive the encoded audio and video data in real time and decode the received audio and video data. The user equipment 120 may output the decoded audio and video data through respective output devices such as a display module and/or speakers. Particularly, user equipment 120 may display the game screens through a respective display module and play back the sounds through at least one speaker. A user may play the respective game while watching the game screens and listening to the sounds. A user may enter user inputs based on the game screens and sounds output through the respective output devices. The user inputs may be transmitted to cloud computing server 110 in real time.

User inputs may be received S600, and determination may be made as to whether the user inputs are commands for termination of the respective game program or commands for continuously progressing the respective game program S610. When the received user inputs are the commands for continuously progressing the respective game program (Commands for progress-S610), the respective game program may continuously progress based on the received user inputs S540. When the received user inputs are commands for termination of the respective game program, then cloud computing server 110 may terminate the corresponding streaming game service.

Figure 6:
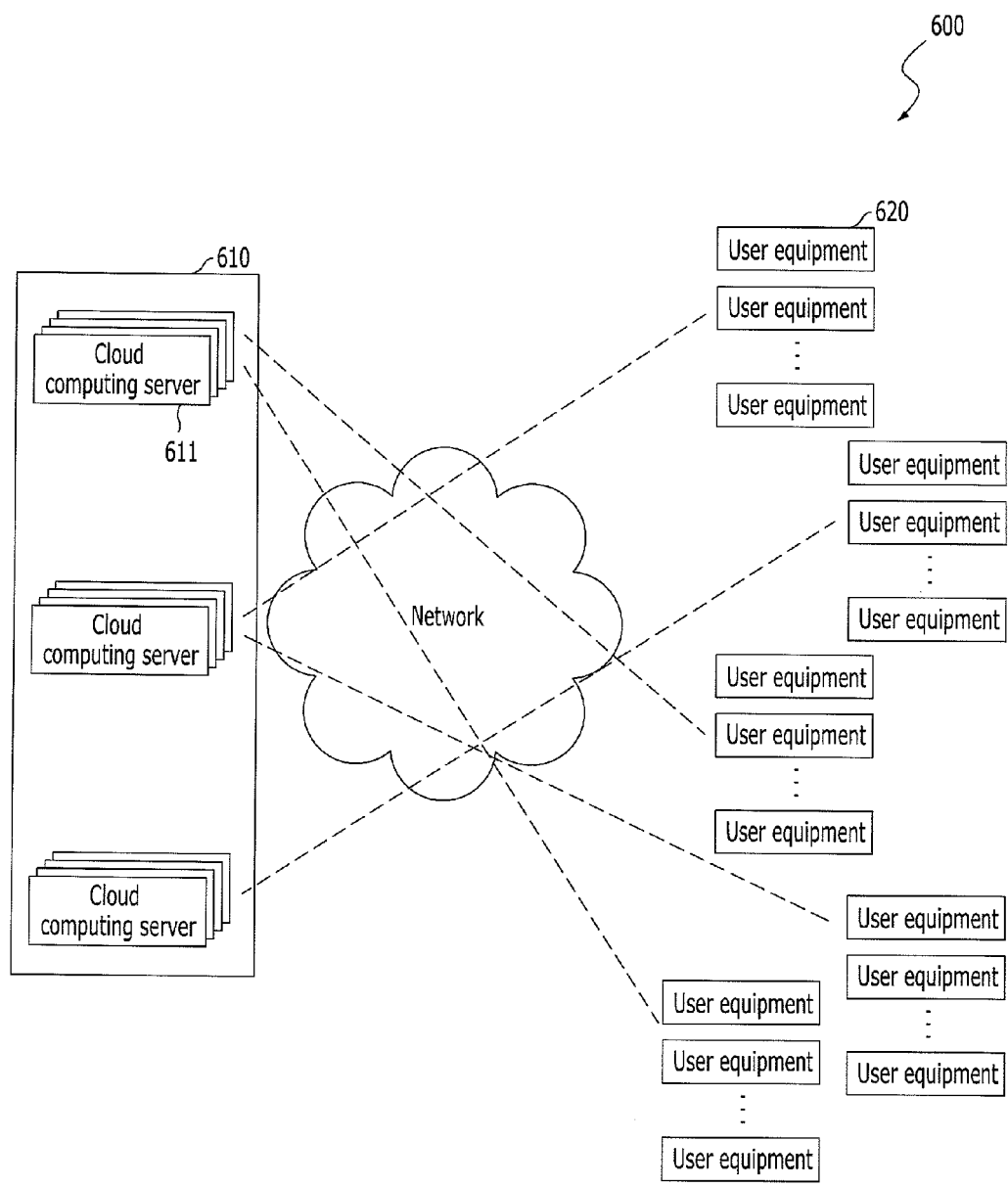
FIG. 6 illustrates a cloud computing system for providing a streaming game service, in accordance with embodiments.

FIG. 6 illustrates a cloud computing system for providing a streaming game service, in accordance with embodiments. Cloud computing system 600 in accordance with embodiments may include server farm 610 and a plurality of user equipments 620, which may be coupled through networks. Server farms 610 may include multiple groups of cloud computing servers 611. Cloud computing servers 611 may have similar configuration and perform similar functions as compared to cloud computing server 110 of FIG. 1.

As shown in FIG. 6, the cloud computing system 600 may have an N-to-N service structure unlike the cloud computing system 100 of FIG. 1 having a 1-to-N service structure, in accordance with embodiments. For example, each group of cloud computing servers 611 may simultaneously provide streaming game services to a plurality of user equipments. Cloud computing servers 611 may be distributed throughout wide regions. For example, cloud computing server 611 may be distributed globally. Such distributed cloud computing servers 611 may be grouped based on locations thereof or based on distances to respective user equipments 620. For example, adjacent cloud computing servers 611 may be grouped to simultaneously provide multiple streaming game services to plurality of user equipments 620 located comparatively close in real time without delay.

Since plurality of cloud computing servers 611 are grouped, there may be more fault tolerance and more processing power. For example, when one of cloud computing servers 611 in one group has failed, another cloud computing server 611 in the same group may be immediately replace it for continuously providing a respective streaming game service without interruption. Furthermore, a streaming game service may be provided at a high speed due to the group of cloud computing servers 611 may have more processing power than one cloud computing server. Accordingly, the respective streaming game service may be provided with enhanced stability to multiple users.

In accordance with embodiments, a cloud computing server may execute and progress entire respective game programs in response to user inputs and provide only progress results of the respective game program. Accordingly, a respective streaming game service may be provided to users without requiring high-end user equipments, in accordance with embodiments. Since some embodiments do not require installing game programs in user equipment, illegal duplication and illegal distribution of respective game programs can be prevented.

In accordance with embodiments, a hybrid capturing scheme may be performed. For example, audio and video data may be captured by dynamically performing one of a software-based audio and video capturing scheme and a hardware-based audio and video capturing scheme, according to the resolution of a game screen. Accordingly, efficiency of capturing audio and video data may be improved, in embodiments.

In embodiments, a streaming game service may be provided using one game service and one streaming service. In embodiments providing a streaming game service, relatively large amounts of user equipment resources and lead efficient energy consumption may be preserved. Accordingly, an apparatus and method for providing a streaming game service in accordance with embodiments may be a service-side technology suitable for low-carbon green IT.

In accordance with embodiments, a plurality of game services may be provided without requiring high-end user equipment. In accordance with embodiments, a cloud computing server may execute and progress a respective game program in response to user inputs, capture audio and video data as the progress result of the executed respective game program, and transmit the captured audio and video data to respective user equipments.

In accordance with embodiments, user equipment may receive captured audio and video data as progress result of a respective game and output the received audio and video data through respective output devices. In accordance with embodiments, a cloud computing system may provide a streaming game service. The cloud computing system may include a plurality of cloud computing server and a plurality of user equipments.

Each one of the plurality of cloud computing servers may be configured to execute and progress at least one game program in response to user inputs and capture audio and video data as progress results of the executed at least one game program. The plurality of user equipments may be configured to receive the captured audio and video data from a respective one of the plurality of cloud computing servers, output the audio and video data through respective output devices, receive user inputs based on the output audio and video data, and transmit the user inputs to a respective one of the plurality of cloud computing servers.

Each one of the cloud computing servers may include a game server and a streaming server. The game server may be configured to receive the user inputs, create at least one virtual machine, install a respective game program in the at least one virtual machine, and execute and progress the installed respective game program in response to the user inputs. The streaming server may be configured to capture the audio and video data generated from the game server as the progress result of the installed game program, encode the captured audio and video data, and stream the encoded audio and video data to a respective one of the plurality of user equipments.

The game server may generate game screens and sounds as the progress result of the installed game program and output the audio and video data as the generated game screens and sounds. Such a streaming server may include a plurality of processing units for simultaneously capturing, encoding, and streaming audio and video data generated from the at least one virtual machine in parallel.

Each one of the plurality of processing units may include an audio and video capturing unit, an audio and video encoding unit, and a streaming unit. The audio and video capturing unit may be configured to capture the audio and video data generated from the game server as the progress result of the at least one game program. The audio and video encoding unit may be configured to encode the captured audio and video data. The streaming unit may be configured to stream the encoded audio and video data to a plurality of user equipments.

The cloud computing server may perform one of a software-based audio and video data capturing scheme and a hardware-based audio and video data capturing scheme according to a resolution of the audio and video data generated from the game server.

The streaming server may further include a software-based audio and video data capturing unit coupled to the game server through a network. When the resolution of the audio and video data is lower than a reference resolution, the game server may transmit the audio and video data stored in a frame buffer to the software-based audio and video data capturing unit through the network and the software-based audio and video data capturing unit may capture the audio and video data received from the frame buffer through the network as the software-based audio and video data capturing scheme.

The cloud computing server may further include a hardware-based audio and video data capturing unit coupled to the game server through a physical cable. When the resolution of the audio and video data is equal to and/or greater than a reference resolution, the hardware-based audio and video data capturing unit may capture the audio and video data generated from the game server as the progress results of the installed game program.

The hardware-based audio and video data capturing device may be an independent device for capturing video data generated from the game server. The hardware-based audio and video data capturing device may be coupled to the game server through a physical cable and coupled to the streaming server through one of a physical cable and a network.

The physical cable may be a High Definition Multimedia Interface (HDMI) cable and the hardware-based audio and video data capturing unit may be a frame grabber. The cloud computing server may be equipped with a graphic card having an independent graphic processing unit (GPU). The plurality of cloud computing servers may be grouped based on locations thereof or a distance to a respective user equipment and operate as one cloud computing server in respect to user equipments.

In accordance with embodiments, a method may be provided for providing a streaming game service using a plurality of cloud computing servers. The method may include receiving user inputs from at least one user equipments, executing and progressing at least one game program in response to the user inputs, capturing audio and video data as progress results of the executed at least one game program, and streaming the captured audio and video data to a respective user equipment.

The at least one user equipment may receive the captured audio and video data from a respective one of the plurality of cloud computing servers, output the audio and video data through respective output devices, receive user inputs based on the output audio and video data from a respective user, and transmit the user inputs to a respective one of the plurality of cloud computing servers. The respective one of the plurality of cloud computing server may receive the user inputs and continuously progress a respective game program based on the received user inputs.

In the executing and progressing at least one game program, at least one virtual machine may be created, a respective game program may be installed in the at least one virtual machine, and the installed respective game program may be executed and progresses in response to the user inputs.

The method may further include encoding the captured audio and video data before the streaming the captured audio and video data. The audio and video data may be game screens and sounds generated as the progress result of the installed game program. In the capturing audio and video data as progress results of the executed at least one game program, one of a software-based audio and video data capturing scheme and a hardware-based audio and video data capturing scheme may be performed according to a resolution of the audio and video data generated from the game server.

When the resolution of the audio and video data is lower than a reference resolution, the audio and video data stored in a frame buffer of a game server may be transmitted to a streaming server through a network and the streaming server may capture the audio and video data as the software-based audio and video data capturing scheme. When the resolution of the audio and video data is equal to and/or greater than a reference resolution, the audio and video data generated from a game server may be captured using a hardware-based audio and video data capturing unit. The hardware-based audio and video data capturing device may be an independent device for capturing video data generated from the game server and the hardware-based audio and video data capturing device may be coupled to the game server through a physical cable.

The invention may also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion. Also, functional programs, codes, and code segments for accomplishing the present invention may be easily construed by programmers skilled in the art to which the present invention pertains.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cloud computing system for providing a streaming game service, the cloud computing system comprising:
a plurality of cloud computing servers each configured to execute and progress at least one game program in response to user inputs and capture audio and video data as progress results of the executed at least one game program; and
a plurality of user equipments configured to receive the captured audio and video data from a respective one of the plurality of cloud computing servers, output the audio and video data through respective output devices, receive user inputs based on the output audio and video data, and transmit the user inputs to a respective one of the plurality of cloud computing servers,
wherein each one of the cloud computing servers comprises:
a game server configured to receive the user inputs, create at least one virtual machine, install a respective game program in the at least one virtual machine, and execute and progress the installed respective game program in response to the user inputs;
an audio and video data capturing unit configured to capture the audio and video data generated from the game server as the progress result of the installed game program; and
a streaming server configured to encode the captured audio and video data and stream the encoded audio and video data to a respective one of the plurality of user equipments,
wherein the audio and video data capturing unit includes a hardware-based audio and video data capturing unit and a software-based audio and video data capturing unit, and
wherein the cloud computing server is configured to compare a resolution of the audio and video data from the game server with a reference resolution and the streaming server is configured to allocate one of the software-based audio and video data capturing unit and the hardware-based audio and video data capturing unit according to the comparison result.

2. The cloud computing system of claim 1, wherein the game server generates game screens and sounds as the progress result of the installed game program and output the audio and video data as the generated game screens and sounds.

3. The cloud computing system of claim 1, wherein the each one of the cloud computing servers comprises a plurality of processing units for simultaneously capturing, encoding, and streaming audio and video data generated from the at least one virtual machines in parallel.

4. The cloud computing system of claim 3, wherein each one of the plurality of processing units comprises:
an audio and video encoding unit configured to encode the captured audio and video data,
wherein the streaming server is configured to stream the encoded audio and video data to a plurality of user equipment.

5. The cloud computing system of claim 1, wherein
when the cloud computing server determines that the resolution of the audio and video data is lower than the reference resolution, the game server transmits the audio and video data stored in a frame buffer to the software-based audio and video data capturing unit through the network and the software-based audio and video data capturing unit captures the audio and video data received from the frame buffer through the network.

6. The cloud computing system of claim 1, wherein
when the cloud computing server determines that the resolution of the audio and video data is equal to or greater than the reference resolution, the hardware-based audio and video data capturing unit captures the audio and video data generated from the game server as the progress results of the installed game program.

7. The cloud computing system of claim 6, wherein:
the hardware-based audio and video data capturing device is a device physically separated from the game service and capturing video data generated from the game server; and
the hardware-based audio and video data capturing device is electrically coupled to the game server through a physical cable and coupled to the streaming server through one of a physical cable and a network.

8. The cloud computing system of claim 6, wherein the physical cable is a High Definition Multimedia Interface (HDMI) cable and the hardware-based audio and video data capturing unit is a frame grabber.

9. The cloud computing server of claim 1, wherein the cloud computing server is equipped with a graphic card having an independent graphic processing unit (GPU).

10. The cloud computing system of claim 1, wherein the plurality of cloud computing servers are grouped based on locations thereof or a distance to a respective user equipment and operate as one cloud computing server in respect to user equipments.

11. A method for providing a streaming game service using a plurality of cloud computing servers each having at least one processors and coupled to user equipments through a network, the method comprising:
receiving, by a game server, user inputs from at least one user equipments;
executing and progressing, by the game server, at least one game program in response to the user inputs;
capturing, by an audio and video capturing device, audio and video data as progress results of the executed at least one game program; and
streaming, by a streaming server, the captured audio and video data to a respective user equipment,
wherein in the capturing audio and video data, the audio and video data is generated by the game server and the generated audio and video data is captured by the audio and video data capturing device,
wherein the capturing audio and video data includes:
comparing a resolution of the audio and video data generated from the game server with a reference resolution; and
allocating one of a hardware-based audio and video data capturing unit and a software-based audio and video data capturing unit according to the comparison result to capture the audio and video data.

12. The method of claim 11, wherein:
the at least one user equipment receives the captured audio and video data from a respective one of the plurality of cloud computing servers, outputs the audio and video data through respective output devices, receive user inputs based on the output audio and video data from a respective user, and transmit the user inputs to a respective one of the plurality of cloud computing servers; and
the respective one of the plurality of cloud computing server receives the user inputs and continuously progress a respective game program based on the received user inputs.

13. The method of claim 11, wherein in the executing and progressing at least one game program, at least one virtual machine is created, a respective game program is installed in the at least one virtual machine, and the installed respective game program is executed and progresses in response to the user inputs.

14. The method of claim 11, further comprising: encoding, by an audio and video encoding device, the captured audio and video data before the streaming the captured audio and video data.

15. The method of claim 11, wherein the audio and video data is game screens and sounds generated as the progress result of the installed game program.

16. The method of claim 11, wherein in capturing audio and video data as progress results of the executed at least one game program, one of a software-based audio and video data capturing scheme and a hardware-based audio and video data capturing scheme is performed according to a resolution of the audio and video data generated from the game server.

17. The method of claim 11, wherein
when the resolution of the audio and video data is lower than the reference resolution, the audio and video data stored in a frame buffer of the game server is transmitted to a streaming server through a network and the software-based audio and video data capturing unit captures the audio and video data.

18. The method of claim 11, wherein:
when the resolution of the audio and video data is equal to or greater than a reference resolution, the audio and video data generated from the game server is captured using the hardware-based audio and video data capturing unit; and
the hardware-based audio and video data capturing device is a device physically separated from the game server, electrically coupled to the game service through a physical cable and capturing video data generated from the game server.

19. The method of claim 18, wherein the physical cable is a High Definition Multimedia Interface (HDMI) cable and the hardware-based audio and video data capturing unit is a frame grabber.

20. A cloud computing system for providing a streaming game service, the cloud computing system comprising:
a plurality of cloud computing servers each configured to execute and progress at least one game program in response to user inputs and capture audio and video data as progress results of the executed at least one game program; and
a plurality of user equipments configured to receive the captured audio and video data from a respective one of the plurality of cloud computing servers, output the audio and video data through respective output devices, receive user inputs based on the output audio and video data, and transmit the user inputs to a respective one of the plurality of cloud computing servers,
wherein each one of the cloud computing servers comprises:
a game server configured to receive the user inputs, create at least one virtual machine, install a respective game program in the at least one virtual machine, and execute and progress the installed respective game program in response to the user inputs; and
a streaming server configured to capture the audio and video data generated from the game server as the progress result of the installed game program, encode the captured audio and video data, and stream the encoded audio and video data to a respective one of the plurality of user equipments,
wherein the cloud computing server further comprises a hardware-based audio and video data capturing unit coupled to the game server through a physical cable; and
when the resolution of the audio and video data is equal to or greater than a reference resolution, the hardware-based audio and video data capturing unit captures the audio and video data generated from the game server as the progress results of the installed game program, and wherein the physical cable is High Definition Multimedia Interface (HDMI) cable and the hardware-based audio and video data capturing unit is a frame grabber.

* * * * *